US012477440B2

(12) United States Patent
Coutelou et al.

(10) Patent No.: US 12,477,440 B2
(45) Date of Patent: Nov. 18, 2025

(54) BROADCASTING COMMUNICATING DEVICES MANAGEMENT

(71) Applicant: Schneider Electric Industries SAS, Rueil Malmaison (FR)

(72) Inventors: Olivier Coutelou, Grenoble (FR); Thierry Chiche, Saint Ismier (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 450 days.

(21) Appl. No.: 17/974,641

(22) Filed: Oct. 27, 2022

(65) Prior Publication Data

US 2023/0146225 A1 May 11, 2023

(30) Foreign Application Priority Data

Nov. 8, 2021 (EP) ..................................... 21306563

(51) Int. Cl.
*H04W 4/00* (2018.01)
*H04L 5/00* (2006.01)
(Continued)

(52) U.S. Cl.
CPC ............. *H04W 48/10* (2013.01); *H04L 5/006* (2013.01); *H04W 72/542* (2023.01)

(58) Field of Classification Search
USPC ................................................. 370/329, 330
See application file for complete search history.

(56) References Cited

U.S. PATENT DOCUMENTS

2015/0195136 A1* 7/2015 Mermoud ............. H04L 47/365
706/12
2015/0256668 A1 9/2015 Atkinson et al.
(Continued)

FOREIGN PATENT DOCUMENTS

ES 2559641 A1 2/2016

OTHER PUBLICATIONS

European Search Report and Search Opinion dated April 20, 2022 for corresponding European Patent Application No. EP21306563.4, 10 Pages.

*Primary Examiner* — Chuong T Ho
(74) *Attorney, Agent, or Firm* — Quinn IP Law

(57) ABSTRACT

A method for managing single function devices among communication devices broadcasting messages to gateways connected to a gateway manager, a single function device being only able to broadcast a message including a command. The method comprises: the gateways receiving messages sent from communication devices, each message containing an identifier of communication device, the gateways determining quality metrics for each received message, the quality metrics pertaining to the radio link between the gateway and the communication device, the gateways storing, for each received message, a property vector comprising the identifier of the communication device and the quality metrics, the gateway manager collecting the property vectors from all the gateways, the gateway manager identifying a single function device by detecting a property vector comprising an identifier of communication device that is included in a list of single function devices, the gateway manager determining a location of the identified single function device based on the quality metrics of the detected property vector, the gateway manager coupling the identified single function device with a feedback device, based on the determined location of the single function device and on a location of the feedback device, and the gateway manager sending an order to the coupled feedback device to perform a feedback signal.

15 Claims, 3 Drawing Sheets

(51) Int. Cl.
*H04W 48/10* (2009.01)
*H04W 72/542* (2023.01)

(56) References Cited

U.S. PATENT DOCUMENTS

| | | | |
|---|---|---|---|
| 2018/0337803 A1* | 11/2018 | Sauerwein, Jr. | H04L 9/32 |
| 2020/0100239 A1* | 3/2020 | Jassal | H04L 5/0094 |
| 2020/0127911 A1* | 4/2020 | Gilson | H04L 43/0847 |
| 2024/0256412 A1* | 8/2024 | Sims | H04W 52/0219 |

* cited by examiner

BROADCASTING COMMUNICATING DEVICES MANAGEMENT

FIELD OF INVENTION

The present invention generally relates to industrial automation systems, and more particularly relates to wireless device mobility in networks having a star topology.

BACKGROUND

The Internet of Things (IoT) is an essential element of the digital development of companies. On many markets, connected objects capture valuable information. Industrial IoT devices are mainly sensors linked to machines that are located in different areas of industrial sites and measure, record, and send operating data to a data center to be analyzed. These sensors are for example wireless devices that are powered by an internal battery.

In networks for industrial automation systems, for example having a star topology, communication devices such as wireless sensors are permanently connected and paired to a unique gateway and communicate only with the paired gateway. Any packet exchange between communication devices must go through the gateway, thus advantageously packets go through at most one wireless hop to reach their destination. The disadvantage of this star topology is the operation of the network that depends on the gateway of the network, and as all packets must go through the gateway, the gateway may become bottlenecked.

In networks for industrial automation systems, some communication devices are coupled with feedback devices in order that when a communication device is activated by a user by triggering a command, the coupled feedback device is able to inform the user about the status of the command. These communication devices and feedback devices are fixed, for example linked to a machine, and paired to a gateway. Typically, a communication device can be a wireless push button attached to a machine and the feedback device can be a stack light standing upon the machine. When the operator presses the push button, the stack light will blink to provide a feedback to the operator, by means of the paired gateway.

However, when a communication device is out of range of its paired gateway, messages sent by said communication device are lost, and even if the message are received by another gateway (not paired with the wireless sensor), the messages will not be processed.

There is no solution when the communication device is a mobile communication device like a self-powered wireless push button that does not have any interface (no LED, no vibration, no sound, etc.). The user is not confident when using a wireless actuator if there is no immediate confirmation that the action has been correctly received.

There is therefore a need for supporting efficiently mobility of communication devices that trigger actions and require feedback devices.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method managing method for managing single function devices among communication devices broadcasting messages to gateways connected to a gateway manager, a single function device being only able to broadcast a message including a command, the method comprising:

the gateways receiving messages sent from communication devices, each message containing an identifier of communication device, the gateways determining quality metrics for each received message, the quality metrics pertaining to the radio link between the gateway and the communication device, the gateways storing, for each received message, a property vector comprising the identifier of the communication device and the quality metrics, the gateway manager collecting the property vectors from all the gateways, the gateway manager identifying a single function device by detecting a property vector comprising an identifier of communication device that is included in a list of single function devices, the gateway manager determining a location of the identified single function device based on the quality metrics of the detected property vector, the gateway manager coupling the identified single function device with a feedback device, based on the determined location of the single function device and on a location of said feedback device, the gateway manager sending an order to the coupled feedback device to perform a feedback signal.

Advantageously, the method provides a solution for selection of the relevant feedback device and a contextual application action when the user activates a single function device like a "mobile wireless toggle push button" on a large site equipped with many gateways.

The method also provides a solution for dynamic coupling of a single function device, like a "wireless toggle push button", and a wireless feedback device according to the location of the both. The single function device may be any simple wireless actuator (e.g., Toggle Push button) just able to broadcast a message (clear text or encrypted) and having no capacity to receive incoming message. The feedback devices can be totally independent of single function devices and just able to receive a message.

In an embodiment, the feedback signal is related to the command included in the message sent by the single function device.

In an embodiment, the gateway manager instructs an application to perform an action corresponding to the command included in the message sent by the single function device. It provides a dynamic and contextual application action for the single function device, like a "wireless toggle push button", according to the selected feedback device, and according to the geolocation of the single function device.

In an embodiment, the gateway manager instructs the application to perform the action according to the determined geolocation of the selected single function device.

In an embodiment, the gateway manager automatically infers the type of command included in the message based on the identifier of communication device and instructs the application to perform the action according the type of command.

In an embodiment, the location of feedback device coupled with the identified single function device is predefined or determined based on the quality metrics of a property vector comprising an identifier of communication device that is included in a list of feedback devices.

In an embodiment, the coupling of the identified single function device with the feedback device is based on a distance between the location of the identified single function device and the location of the feedback device.

In an embodiment, the feedback device presenting the smallest distance with the single function device is selected.

In an embodiment, a distance between the identified single function device and any feedback device is adapted according to the determined locations of the identified single function device and such any feedback device on a predetermined map with predetermined areas.

In an embodiment, the quality metrics comprise a received signal strength indicator and a link quality indicator.

In another implementation there is provided a system comprising a gateway manager and gateways connected to the gateway manager, single function devices among communication devices broadcasting messages to gateways, a single function device being only able to broadcast a message including a command, the system comprising:

the gateways configured to receive messages sent from communication devices, each message containing an identifier of communication device, the gateways configured to determine quality metrics for each received message, the quality metrics pertaining to the radio link between the gateway and the communication device, the gateways configured to store, for each received message, a property vector comprising the identifier of the communication device and the quality metrics, the gateway manager configured to collect the property vectors from all the gateways, the gateway manager configured to identify a single function device by detecting a property vector comprising an identifier of communication device that is included in a list of single function devices, the gateway manager configured to determine a location of the identified single function device based on the quality metrics of the detected property vector, the gateway manager configured to couple the identified single function device with a feedback device, based on the determined location of the single function device and on a location of said feedback device, the gateway manager configured to send an order to the coupled feedback device to perform a feedback signal.

In another implementation there is provided a computer-readable medium having embodied thereon a computer program for executing a method for single function devices among communication devices broadcasting messages to gateways connected to a gateway manager. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
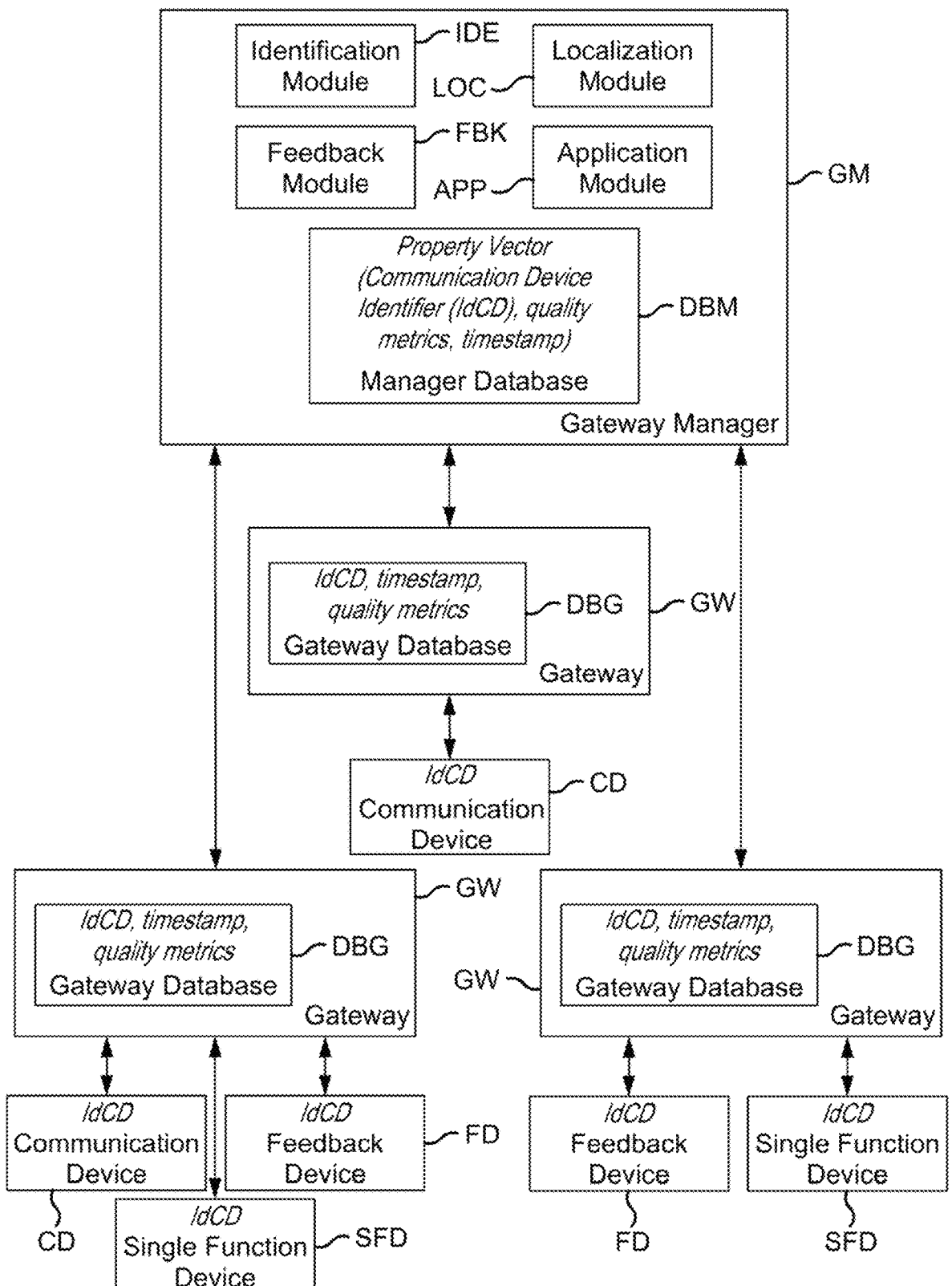
FIG. 1 shows a schematic block diagram of a communication system according to one embodiment of the invention for managing single function devices among communication devices broadcasting messages to gateways connected to a gateway manager.

Referring to FIG. 1, a communication system comprises a gateway manager GM and a set of gateways GW communicating with communication devices CD, wherein the gateway manager GM is connected to the set of gateways through wired or wireless links and the gateways GW are paired with communication devices CD through wireless links. In one embodiment, the gateway manager GM and the gateways GW form a network with star topology, in which all gateways GW as nodes are individually connected to the gateway manager GM as a central connection point.

The gateway manager GM is connected to the set of gateways GW through wired or wireless links, forming a packet network, for example, an IP ("Internet Protocol") high-speed network such as the Internet or an intranet, or even a company-specific private network. Communications between the gateway manager GM and the set of gateways may be based on a TCP/IP protocol. The gateway manager GM manages dynamically the pairing of any communication device to the most appropriate gateway GW with respect to quality metrics relating to radio link. The gateway manager GM is able to consider the quality of the radio link of a message sent by the communication device and received by the different gateways in the radio range of the communication device.

A gateway GW can be connected to one or several communication devices through wireless link, for example based on as Zigbee, Zigbee Green Power or Bluetooth low energy or other short range technologies. In another example, the gateways GW are part of a telecommunication network that is a public wireless network of limited scope, such as WLAN (Wireless Local Area Network) or conforming to a standard 802.1x, or medium range according to the protocol WiMAX (World Wide Interoperability Microwave Access).

A communication device CD is able to send operating data to a data center or a local application to be analyzed and processed. The communication device CD sends the operating data to the data center through the gateways toward the gateway manager that the appropriate data center or application for the analyze of data. The communication device CD can be any type of Industrial IoT devices able to send operating data. Some communication devices CD may be powered by an internal battery or self-powered. or using any power supply using energy harvesting solution (e.g. piezo, electromagnetic generator, photovoltaic . . . ).

The communication device CD may be any type of sensor, such as a pressure sensor, fluid level detector, electrical current/voltage meter, pH-meter, leakage/strain detector, incident or occurrence counter, or velocity/acceleration meter. Thus, any sensor capable of measuring a particular sensor value or capturing a particular event may be connected to a gateway GW. Furthermore, the communication devices CD may be a sensor able to measure temperature, humidity and temperature, or energy measurement etc. The communication device CD may be also any type of push button or device as a wearable command.

The communication device CD may be any type of actuator that performs an action causing a machine or other entity to operate or modifying the state or behavior of such a machine. For example, an actuator may be associated with a lighting device signaling an alarm or a call for action.

A communication device CD can be paired with only one gateway GW whereas one gateway can be paired with several communication devices. When a gateway GW is paired with a communication device CD, the gateway allocates a dedicated channel for communication with the communication device. The dedicated channel reserves memory zones of a memory of the gateway for storing operating data coming from the communication device.

A single function device SFD is a communication device having a network interface only able to broadcast a message including a command. For example, the single function device is a wearable wireless toggle push button which triggers only one command of type "toggle". The single function device SFD can be self-powered and does not have any user interface except the push button: no LED, no vibration, no micro, no sound, etc.

After commissioning and during operation, a communication device CD sends messages in a broadcast way, without knowing the gateway which is paired with it. A message sent by a communication device contains an identifier IdCD of the communication device and operating data, like a value of a measure by the wireless sensor. The gateway GW paired with the communication device CD can identify this latter thanks to the identifier IdCD of the communication device contains in the message and can process the payload of the message, i.e. the operating data, via the dedicated channel associated with the communication device.

When a gateway GW receives a message from a communication device CD that is not paired with the gateway, the payload of the message is ignored, thus the operating data are not processed. However, the gateway GW can analyze the signal characteristics of the received message.

If the communication device is a single function device, the operating data in a broadcast message received by a gateway corresponds to a command of type "toggle". If the gateway is not paired with the single function device, the operating data is ignored and not decoded, only the identifier IdCD of the communication device in the message can be processed.

The gateway manager GM and the gateways GW can be synchronized in time, for example by using a shared clock or by updating regularly the clock of the gateways GW.

A gateway GW can receive messages from any communication device, in the radio range, but can only process operating data of messages sent by a communication device that is paired with the gateway.

Any message received by a gateway GW is analyzed by the gateway to determine quality metrics of the radio link between the gateway and the communication device having sent the message. The quality metrics can comprise, but not limited to, a received signal strength indicator (RSSI) and a link quality indicator (LQI). The LQI is an indication of the quality of the data packets of a message received by the gateway and the RSSI can be used as a measure of the signal strength of the message received by the gateway.

Each gateway stores in a gateway database DBG, for each received message, a property vector PV comprising the identifier IdCD of the communication device having sent the message, a timestamp corresponding to the time of reception of the message and the quality metrics.

At regular time intervals, for example every "M" seconds with "M" being an integer, or after each modification, the content of the gateway database of each gateway GW is transmitted (or read by) to the gateway manager GM to feed a manager database DBM.

The manager database DBM contains property vectors PV stored in correspondence respectively with identifiers IdGW of the gateways. The manager database DBM is linked to the gateway manager GM, being included in the gateway manager or implemented in another entity accessible by the gateway manager.

In one embodiment, the gateway manager GM can further manage a pairing database that contains at least identifiers of communication device stored in correspondence respectively with identifiers of the gateways that have been paired with communication devices.

The gateway manager GM includes an identification module IDE, a localization module LOC, a feedback module FBK and an application module APP.

The identification module IDE of the gateway manager GM is able to analyze the property vectors of the manager database DBM to identify single function devices and feedback devices that have sent messages, in order to determine and update their locations.

The localization module LOC of the gateway manager GM is able to determine the location of a single function device or a feedback device, once identified, by means of the quality metrics that are extracted from the corresponding property vector.

In one embodiment, the location determination can take into account the location of the gateways having received the message. The location determination can be based on one of several methods have been introduced in the literature that leverage radio measurements to infer location information.

In one example, geolocation calculation is based on triangulation. The spatial coordinates of the different gateways are known and are fixed. From these anchors, a classic vector barycenter calculation makes it possible to determine the point in space which is supposed to be the location of the communication device. For this barycenter calculation, each gateway is assigned a weight, which is inversely proportional to a power of the RSSI level received by said gateway.

It is assumed that the closer (in a radio context) to a gateway a communication device is, the better quality metrics of a message received by the gateway from the communication device are. But in some cases quality metrics of a message received by a farther gateway can be better than the quality metrics of a message received by a closer gateway, for example if there are obstacles between the communication device and said closer gateway that reduce the quality of the signal carrying the message. In one embodiment, the location determination can take into account a predetermined map with predetermined areas, wherein a selected feedback device should be located in the same area as the single function device. In another embodiment, the location determination can take into account a predetermined map with predetermined areas containing such obstacles, in order to adjust the contribution of obstacles on the quality metrics.

The feedback module FBK of the gateway manager GM is able to select an appropriate feedback device to be coupled with an identified single function device, based on the location of the identified single function device and the feedback device. The purpose of the feedback device is to provide a relevant feedback signal to the user having actioned the single function device. The feedback signal is relevant if it can be easily sensed by the user, to confirm that the action of the single function device has been taken into account (meaning the command has been received).

The feedback module FBK of the gateway manager GM is then able to send a message order to the selected feedback device to perform the feedback signal.

The application module APP of the gateway manager GM is able to take into account the event that a message has been received from a single function device, which triggers an application which is using the location of the single function device to perform a contextual relevant action.

In one example, an operator is in front of a machine and sees a problem. The operator presses a wearable wireless push button fixed on his jacket (an actuator as a single function device). A stack light (as feedback device) of the machine will blink to provide a feedback signal to the operator that understands "maintenance request on the machine is received". In parallel, a relevant workorder is generated for maintenance of machine.

Figure 2:
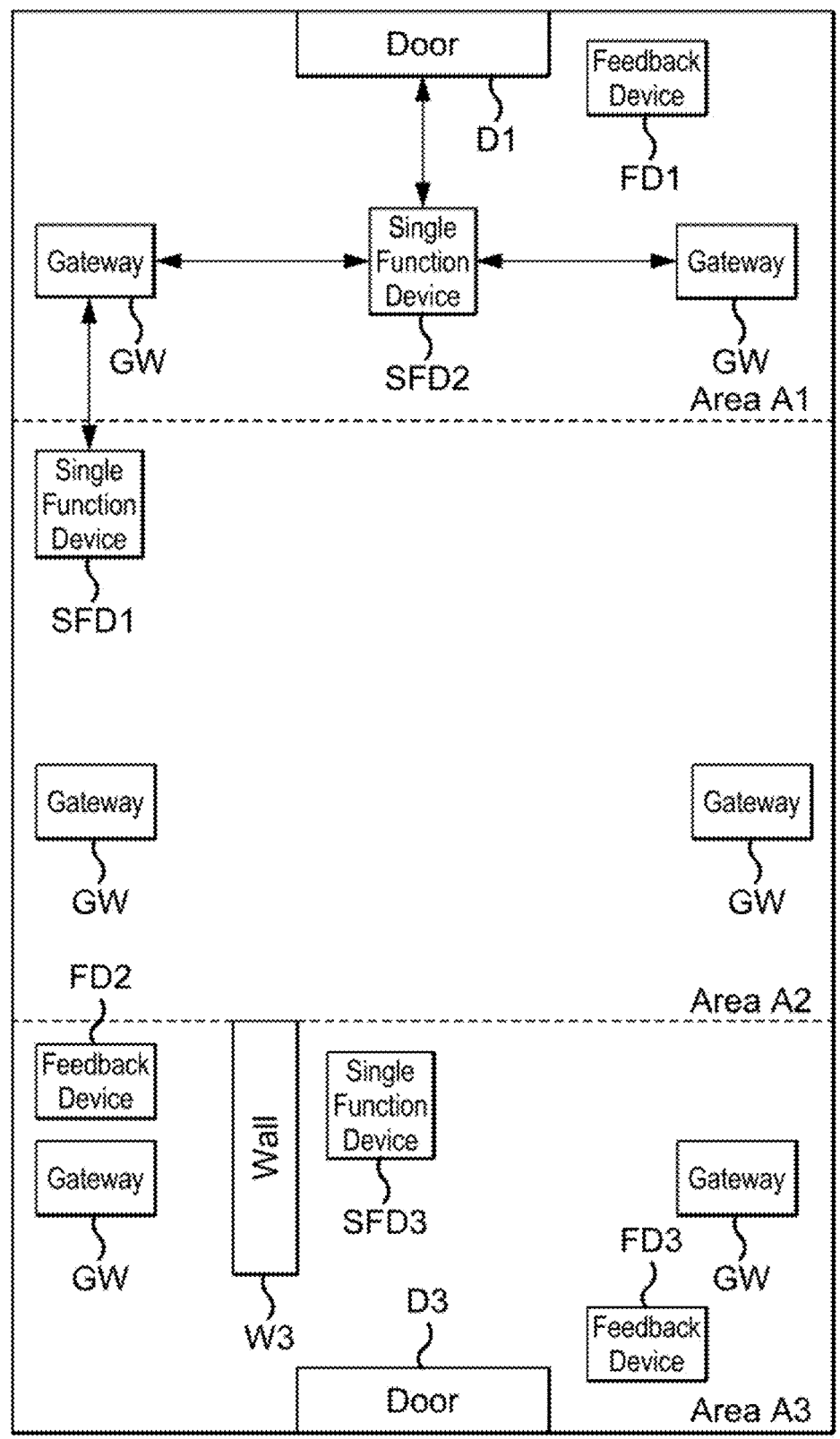
FIG. 2 illustrates an example of single function devices, feedback devices and gateways in predetermined areas.

Referring to FIG. 2, there are provided industrial doors which must be open only when a wireless push button linked to a mobile vehicle is activated and when the vehicle is close to the door, detected in the relevant area. In this example, a factory can be divided in different areas A1, A2 and A3, areas A1 and A3 having respective industrial doors D1 and D3 and different gateways GW. In area A1, a stack light FD1 is placed near door D1. In area A3, a stack light FD3 is placed near door D3 and a stack light FD2 is placed in a space delimited by a wall W3.

When a wireless push button as single function device SFD1 is activated in area A2, it is detected that the stack light FD1 is not located in the same area as the single function device SFD1. Therefore door D1 will stay closed even if the RSSI level of the signal received by the gateway is high.

When a wireless push button as single function device SFD2 is activated in area A1, a message order is sent to the stack light FD1 of the area A1 to blink and a contextual relevant action to open the door D1 of area A1 is triggered. The RSSI level of the signal received by the gateway is lower than previous case (from SFD1) but the stack light FD1 is located in the same area as the single function device SFD2.

When a wireless push button as single function device SFD3 is activated in area A3, a message order is sent to the stack light FD3 of the area A3 to blink and a contextual relevant action to open the door D3 of area A3 is triggered. The single function device SFD3 is located in the same area as stack light FD2 and stack light FD3. The stack light FD2 presents the smallest distance with the single function device SFD3, however stack light FD2 is hidden behind wall W3 with respect to single function device SFD3, therefore stack light FD3 is selected to be coupled with the single function device SFD3 as the operator will be able to see the blinking light of stack light FD3.

An embodiment comprises a gateway GW or a gateway manager GM under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Figure 3:
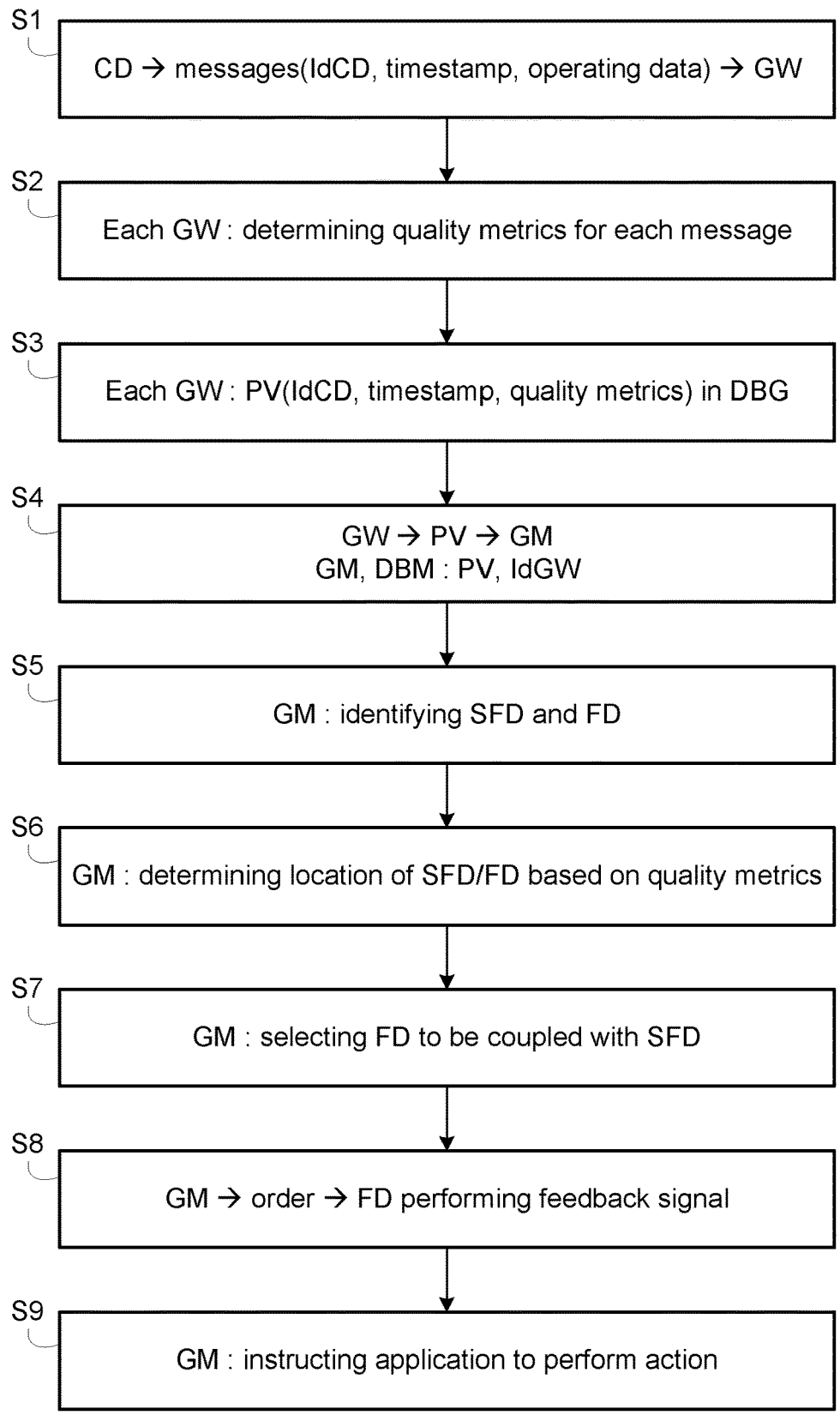
FIG. 3 shows a flow chart illustrating a method for managing single function devices among communication devices broadcasting messages to gateways connected to a gateway manager according to one embodiment of the invention.

With reference to FIG. 3, a method for managing single function devices SFD among communication devices CD broadcasting messages to gateways GW connected to a gateway manager GM according to one embodiment of the invention comprises steps S1 to S9.

In step S1, the communication devices CD send messages in broadcast, after having performed a specific action, like a measure, or when an event occurs, for example a human action, the end of a counter, or a detection of a piece. Among communication devices, at least one single function device SFD sends a message in broadcast, for example after a human action like a pression on a button of the single function device.

Each message contains an identifier IdCD of communication device and operating data, like a status, an action report or a value of a measure. For a single function device SFD, the operating data contain a command, for example a "toggle" command.

The messages are received by gateways GW in the radio range of the communication devices. A message sent by a communication device can be received by one or more gateways, but only one gateway is paired with the communication device and can process the operating data.

In step S2, each gateway GW analyses a received message, by extracting first the identifier IdCD of communication device contained in the received message. By means of the identifier IdCD of communication device, the gateway GW can distinguish if the received message is from a communication device that is paired or not paired with the gateway.

For a message sent by a communication device paired with the gateway, the gateway can extract the operating data contained in the message and send the operating data to a data center or a local application to be analyzed and processed.

It is assumed that a single function device is not paired with a gateway, thus a gateway cannot extract the operating data contained in a message sent by a single function device.

In any case, for each message received by the gateway, the gateway determines quality metrics relating to the radio link between the gateway and the communication device having sent the message. The quality metrics can comprise, but not limited to, a received signal strength indicator (RSSI) and a link quality indicator (LQI).

In step S3, for each received message, the gateway stores the identifier IdCD of communication device, the determined quality metrics and a timestamp in a gateway database DBG. The timestamp corresponds to the time of reception of the message. For a received message, the identifier IdCD of communication device, the determined quality metrics and the timestamp form together a property vector PV for the message.

In step S4, the gateway manager GM collects the property vectors PV from all the gateways GW and stores the collected property vectors PV, optionally in correspondence respectively with identifiers IdGW of the gateways, in the manager database DBM. For example, every "M" seconds the content of the gateway database DBG of each gateway GW is transmitted to the gateway manager GM. In another example, each new content of a gateway database DBG is automatically transmitted to the gateway manager GM.

In step S5, the gateway manager GM identifies single function devices SFD by means of identifiers of communication devices that are extracted from the property vectors and that are included in a list of single function devices and identifies feedback devices FD by means of identifiers of communication devices that are extracted from the property vectors and that are included in a list of feedback devices.

The gateway manager identifies at least one single function device by detecting a property vector PV comprising an identifier of communication device that is included in a list of single function devices.

In a general manner, it is assumed that a single function device SFD is intended to move whereas a feedback device is intended to not move, but some feedback devices can be moved, like a mobile stack light or a drone.

In step S6, for each identified single function device SFD, the gateway manager determines the location of the identified single function device by means of the quality metrics that are extracted from the corresponding property vector.

Similarly, for each identified feedback device FD, the gateway manager determines the location of the identified feedback device by means of the quality metrics that are extracted from the corresponding property vector.

In one embodiment, some feedback devices have a fixed and known location, thus the gateway manager does not need to determine the location of such identified feedback devices.

The determination of the location can be based on several known localization methods that leverage radio measurements and use the location of the gateway to infer the location of the communication device. It is assumed that the location of all the gateways is known as each gateway has a fixed position.

In some embodiments, it can be used some localization methods based on triangulation, using quality metrics of messages from the communication device (single function device or feedback device) received by different gateways in a given time interval, by means of the timestamp of the messages.

In step S7, the gateway manager GM selects a feedback device to be coupled with the identified single function device, based on the determined location of the single function device and on the location of said feedback device.

In one embodiment, the feedback device presenting the smallest distance with the single function device is selected. To that end, the gateway manager calculates the distance between the location of the single function device and any feedback device.

In one embodiment, the distance between the single function device and any feedback device is adapted according their calculated location on a predetermined map with predetermined area potentially comprising visual obstacles. This can be used for complex sites with many walls and shelves.

In step S8, the gateway manager GM sends an order to the coupled feedback device to perform a feedback signal.

The feedback signal is used to confirm that the command is received and is or will be processed. The feedback signal is thus related to the command included in the message sent by the single function device.

In step S9, the gateway manager GM instructs an application to perform an action corresponding to the command included in the message sent by single function device. The application uses the location of the single function device to perform a contextual relevant action.

The operative data contained in the message sent by the single function device have not been decoded and stored, as the single function device is not paired with any gateway. However, the gateway manager GM has identified the single function device (with the identifier of communication device included in a list of single function devices) and automatically infers the type of command based on the identifier of communication device.

For example with an actuator as single function device, the gateway manager GM makes the assumption that the command message is "Toggle" (=change the state from "0" to "1" or from "1" to "0").

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. A method for managing a single function device among communication devices configured for broadcasting messages to gateways connected to a gateway manager, the single function device having a network interface which is configured to broadcast to gateways messages that include operating data that only correspond to a command, the method comprising:
   receiving, by the gateways, messages from respective communication devices, wherein each received message contains operating data and a communication device identifier that identifies a communication device which sent the received message;
   determining, by the gateways, respective quality metrics for each received message, wherein quality metrics for a message pertain to a radio link between the gateway which received the message and the communication device which sent the message;
   storing, by the gateways, for each received message, a property vector comprising the communication device identifier of the communication device which sent the received message and the quality metrics for the received message;
   collecting, by the gateway manager, the property vectors from all the gateways;
   identifying, by the gateway manager, the single function device by detecting a property vector comprising a communication device identifier that is included in a list of single function devices;
   determining, by the gateway manager, a location of the identified single function device based on the quality metrics of the detected property vector;
   coupling, by the gateway manager, the identified single function device with a feedback device, based on the determined location of the single function device and on a location of said feedback device; and
   sending, by the gateway manager, an order to the coupled feedback device to perform a feedback signal, wherein the feedback signal is related to the command included in the message sent by the single function device.

2. The method according to claim 1, wherein the gateway manager instructs an application to perform an action corresponding to the command included in the message sent by the single function device.

3. The method according to claim 2, wherein the gateway manager instructs the application to perform the action according to the determined location of the identified single function device.

4. The method according to claim 3, wherein the gateway manager automatically infers a type of command included in the message based on the communication device identifier and instructs the application to perform the action according the type of command.

5. The method according to claim 1, wherein the location of the feedback device coupled with the identified single function device is predefined or determined based on the quality metrics of the property vector comprising the communication device identifier that is included in the list of feedback devices.

6. The method according to claim 1, wherein the coupling of the identified single function device with the feedback device is based on a distance between the location of the identified single function device and the location of the feedback device.

7. The method according to claim 6, wherein the feedback device presenting the smallest distance with the single function device is selected for the coupling.

8. The method according to claim 6, wherein a distance between the identified single function device and any feedback device is adapted according to the determined locations of the identified single function device and such any feedback device on a predetermined map with predetermined areas.

9. The method according to claim 1, wherein the quality metrics comprise a received signal strength indicator and a link quality indicator.

10. A non-transitory computer-readable medium having embodied thereon a computer program, which when executed, causes the method according to claim 1 to be performed.

11. A system comprising a gateway manager, gateways connected to the gateway manager, and single function devices among communication devices configured for broadcasting messages to gateways, a single function device having a network interface which is configured to broadcast to gateways messages that include operating data that only correspond to a command,
   wherein the gateways are configured to:
   receive messages from respective communication devices, wherein each received message contains operating data and a communication device identifier that identifies a communication device which sent the received message;
   determine respective quality metrics for each received message, wherein quality metrics for a message pertain to a radio link between the gateway which received the message and the communication device which sent the message; and
   store, for each received message, a property vector comprising the communication device identifier of the communication device which sent the received message and the quality metrics for the received message,
   and
   wherein the gateway manager is configured to:
   collect the property vectors from all the gateways;
   identify the single function device by detecting a property vector comprising a communication device identifier that is included in a list of single function devices;
   determine a location of the identified single function device based on the quality metrics of the detected property vector;

couple the identified single function device with a feedback device, based on the determined location of the single function device and on a location of said feedback device; and send an order to the coupled feedback device to perform a feedback signal, wherein the feedback signal is related to the command included in the message sent by the single function device.

12. The system according to claim 11, wherein the gateway manager is further configured to instruct an application to perform an action corresponding to the command included in the message sent by the single function device.

13. The system according to claim 12, wherein the gateway manager is further configured to instruct the application to perform the action according to the determined location of the identified single function device.

14. The system according to claim 13, wherein the gateway manager is further configured to automatically infer a type of command included in the message based on the communication device identifier, and to instruct the application to perform the action according to the type of command.

15. The system according to claim 11, wherein the location of the feedback device coupled with the identified single function device is predefined or determined based on the quality metrics of the property vector comprising the communication device identifier that is included in the list of feedback devices.

* * * * *